United States Patent [19]

Takahara et al.

[11] 4,209,567
[45] Jun. 24, 1980

[54] RED PIGMENT-COATED PHOSPHOR AND METHOD OF PRODUCING THE SAME

[75] Inventors: Takeshi Takahara, Yokosuka; Susumu Matsuura, Yokohama; Toshio Nishimura, Yokohama; Nobuo Inoue, Yokohama, all of Japan

[73] Assignee: Tokyo Shibaura Denki Kabushiki Kaisha, Kawasaki, Japan

[21] Appl. No.: 961,263

[22] Filed: Nov. 16, 1978

[30] Foreign Application Priority Data

Nov. 24, 1977 [JP] Japan ................................ 52-139889
Nov. 24, 1977 [JP] Japan ................................ 52-139890

[51] Int. Cl.$^2$ ..................... H01J 29/28; H01J 29/20; C09K 11/46
[52] U.S. Cl. .................................. 428/403; 427/218; 252/301.4 S; 313/468
[58] Field of Search ................ 252/301.4 R, 301.4 S; 428/403; 427/64, 68, 71, 218; 313/466, 468

[56] References Cited

U.S. PATENT DOCUMENTS

| | | | |
|---|---|---|---|
| 2,858,234 | 10/1958 | Ishler et al. | 252/301.4 R |
| 3,114,065 | 12/1963 | Kaplan . | |
| 3,308,326 | 3/1967 | Kaplan . | |
| 4,021,588 | 5/1977 | Royce et al. | 252/301.4 S X |
| 4,081,398 | 3/1978 | Hase et al. | 252/301.4 S X |

FOREIGN PATENT DOCUMENTS 2447574  4/1976  Fed. Rep. of Germany ........... 313/468

*Primary Examiner*—Jack Cooper
*Attorney, Agent, or Firm*—Cushman, Darby & Cushman

[57] ABSTRACT

A red emitting phosphor having a low luminous reflectance, comprising a rare earth element-based phosphor body activated by europium and a red pigment coated on the phosphor body, is disclosed, the pigment being formed of indium sulfide or of a combination of indium sulfide and an alkali metal sulfate. The phosphor is produced by coating the phosphor body with a complex compound containing of indium sulfide and an alkali metal sulfide, followed by baking in an oxygen containing atmosphere at 400° to 600° C. so as to convert the complex compound into a red pigment consisting of indium sulfide and an alkali metal sulfate.

4 Claims, 3 Drawing Figures

F I G. 1
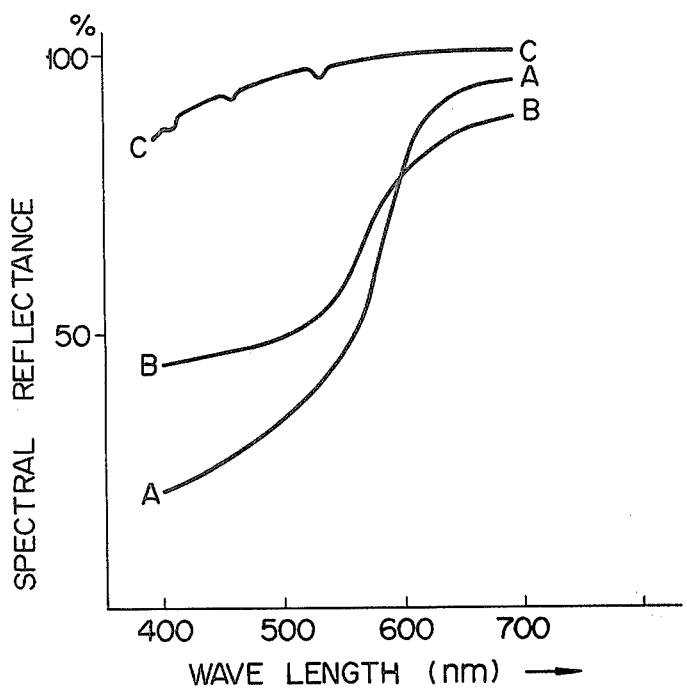

RED PIGMENT-COATED PHOSPHOR AND METHOD OF PRODUCING THE SAME

BACKGROUND OF THE INVENTION

This invention relates to a pigment-coated phosphor for use in a color picture tube.

In a color TV receiver, it is of high importance to minimize the reflection of external light at the phosphor screen in order to enable the phosphor screen to display a picture image of good contrast under a bright external light. To minimize the reflection mentioned, it is customary to use a glass of low light transmittance for forming the front glass panel of a picture tube or to blacken the front glass panel except the portion where a phosphor layer is coated. However, a glass low in light transmittance fails to transmit sufficiently the light emitted from the phosphor layer, resulting in that the picture image displayed on the phosphor screen is darkened. The blackening method is not satisfactory, either, in that the reflection of the external light is not diminished sufficiently because a large portion of the front glass panel is coated with a phosphor layer and, thus, is not blackened.

It is known to the art to coat phosphors emitting red, green and blue lights with red, green and blue pigments, respectively, so as to decrease the reflection of color components of the external light other than the colors of the lights emitted from the phosphors. In a color picture tube utilizing pigment-coated phosphors, the degree of contrast depends to a large extent on the spectral reflectance of the pigment, rendering it very important to select suitable pigments. In addition to spectral reflectance, many properties must be taken into account for selecting suitable pigments. For example, the pigment should not contain harmful substances such as cadmium, lead and mercury. Further, the pigment should not be soluble in water because the phosphor in the form of slurry is coated on the front panel of a picture tube. Still further, heat resistance is of high importance because the slurry of phosphor coated on the glass panel is baked for burning off polyvinyl alcohol, etc. contained in the slurry. Naturally, the pigment should not melt and be free from changes in quality and color in the baking step.

Cadmium sulfoselenide, etc. are known as red pigments displaying brilliant red upon receipt of natural light. Certainly, pigments of this type are satisfactory in spectral reflectance and actually used in picture tubes in some cases. But, such pigments are poisonous and become discolored when heated. Thus, red oxide ($Fe_2O_3$) is used in some cases in a color picture tube in place of the cadmium-based red pigment. However, red oxide is not satisfactory in spectral reflectance.

Under the circumstances, it is a matter of serious concern in this field to develop a pigment displaying a brilliant red, insoluble in water, harmless and having good heat resistance.

An object of this invention is to provide a red-emitting phosphor coated with a red pigment which is harmless and low in luminous reflectance. The pigment is higher in reflectance of light having 600 nm or more of wavelength and lower in reflectance of light having less than 600 nm of wavelength than conventional red pigments. Specifically the phosphor of this invention comprises a rare earth element-based phosphor body activated by europium and a red pigment coated on the phosphor body, said pigment consisting of indium sulfide or a combination of indium sulfide and an alkali metal sulfate.

Another object of this invention is to provide a method of producing a phosphor coated with a pigment, comprising coating a rare earth element-based phosphor body activated by europium with a complex compound containing indium sulfide and an alkali metal sulfide, followed by baking at 400° to 600° C. so as to convert the complex compound into a red pigment consisting of indium sulfide and an alkali metal sulfate.

BRIEF DESCRIPTION OF THE DRAWINGS

This invention can be more fully understood from the following detailed description when taken in conjunction with the accompanying drawings, in which:

FIG. 1 is a graph showing the spectral reflectance of the phosphor of this invention in comparison with the conventional phosphor coated with a pigment.

DETAILED DESCRIPTION OF THE INVENTION

Figure 2:
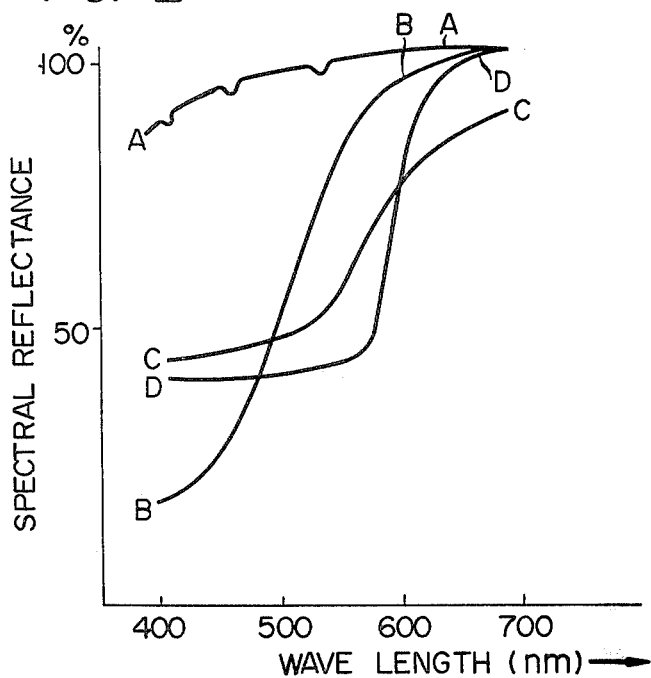
FIG. 2 is a graph showing the spectral reflectance of phosphors according to conventional procedures as compared with applicants' materials prior to baking.

The present inventors have found that a red-emitting phosphor coated with indium sulfide as the red pigment is advantageous over a phosphor coated with a conventional red pigment in reflectance of light having 600 nm or more of wavelength, and that the red pigment of indium sulfide is not poisonous. It has also been found that a yellow complex compound of the general formula, $xA_2S \cdot yIn_2S_3$ ($0.1 \leq x/y \leq 1.5$; "A" representing an alkali metal), can be converted into a red pigment consisting of indium sulfide and an alkali metal sulfate if baked at 400° to 600° C. Incidentally, a phosphor-coated glass panel is subjected in general to a baking treatment at that temperature in the aging step, etc. during manufacture of a picture tube.

In this invention, the molar ratio of x to y in the complex compound $xA_2S \cdot yIn_2S_3$ should be in the range of 0.1:1 to 1.5:1, preferably in the range of 0.3:1 to 1:1. If the molar ratio mentioned is smaller than 0.1, the heat resistance of the complex compound is substantially equal to that of pure $In_2S_3$. On the other hand, the molar ratio is greater than 1.5, the complex compound becomes soluble in water. It follows that the complex compound coated on a phosphor body tends to peel from the phosphor body in the step of preparing a slurry of the coated phosphor body.

As described previously, the complex compound obtained by calcining a mixture of indium compound and an alkali metal compound has a general formula, $xA_2S \cdot yIn_2S_3$ ($0.1 \leq x/y \leq 1.5$; "A" representing an alkali metal). This is substantiated by the following:

(1) The X-ray diffraction pattern of the complex compound differs from that of $In_2S_3$.

(2) The result of wet chemical analysis indicates that the complex compound contains sulphur in excess of stoichiometric molar ratio of $In_2S_3$ and that an alkali metal is also contained in the complex compound.

The complex compound is converted to a red phosphor consisting of indium sulfide and an alkali metal sulfate after baking at 400° to 600° C. under air atmosphere. The following reaction is thought of take place in this baking step:

$$xA_2S \cdot yIn_2S_3 + 2xO_2 \rightarrow xA_2SO_4 + yIn_2S_3 \quad (1)$$

If the baking is carried out at 400° to 600° C., a complex compound of this invention, for example, $xNa_2S \cdot yIn_2S_3$ which is yellow is converted to a brilliantly red pigment. Where the baking temperature is lower than 400° C., reaction (1) mentioned above does not proceed satisfactorily, resulting in that the produced pigment fails to display brilliant red. The baking at a temperature higher than 600° C. is not desirable, either, because the color change from red to yellow takes place under such a high temperature.

X-ray diffraction patterns of both $In_2S_3$ and $A_2SO_4$ are recognized if X-ray diffractometry is applied to the baked substance. It is supposed that surface of indium sulfide ($In_2S_3$) is tightly covered with the alkali metal sulfate ($A_2SO_4$) in the process of reaction (1), thereby preventing oxidation of $In_2S_3$ in the baking step. This supposition is fully supported by the following experiment. Namely, the baked substance was fully washed with water so as to remove the water-soluble $A_2SO_4$, followed by baking again the washed substance. For comparison, the baked substance which had not been water-washed was also baked again. It was recognized that the washed substance was considerably discolored after the re-baking, whereas the other substance remained brilliantly red after the re-baking.

Suitable red-emitting phosphor bodies which are coated with the particular pigment of this invention include, for example, europium activated yttrium oxysulfide ($Y_2O_2S$: Eu), europium activated yttrium oxide ($Y_2O_3$: Eu), europium activated yttrium vanadate ($YVO_4$: Eu), europium activated gadolinium oxide ($Gd_2O_3$: Eu) and europium activated gadolinium oxysulfide ($Gd_2O_2S$: Eu).

Described in the following are Examples of this invention.

EXAMPLE 1

250 g of europium activated yttrium oxysulfide (the red-emitting phosphor body) having an average particle size of about $7\mu$ was dispersed in 2,500 ml of deionized water, followed by adding 10 ml of an aqueous solution of indium chloride to the dispersion, said aqueous solution containing 2.5 g of indium ion ($In^{3+}$). Then, hydrochloric acid was added to the dispersion with the dispersion kept gently stirred so as to adjust the pH value of the dispersion at about 2.2 (allowable pH value ranging from 1 to 3.6). About 200 ml of an aqueous solution containing 1.7 g of sodium sulfide was allowed to drip into the pH value-adjusted dispersion with the dispersion kept stirred, followed by additional stirring for more than 1 hour for aging of the dispersion. It was found that substantially all the indium present in the dispersion was coated on the surface of the phosphor particles in the form of indium sulfide.

After precipitation of the phosphor particles coated with indium sulfide, the supernatent liquid was discharged and the precipated particles washed with deionized water, followed by drying the solid particles at about 125° C. Then, about 7.5 g of sulfur was mixed sufficiently with 250 g of the dried solid particles. The mixture was heated 30 minutes in a quartz crucible at 900° C. under a weak reducing atmosphere, thereby obtaining a red-emitting phosphor coated with indium sulfide.

Appended FIG. 1 shows the spectral reflectance of the produced phosphor. It is seen that wavelength of light is plotted on the abscissa and spectral reflectance on the ordinate in the graph of FIG. 1. Curves A and B shown in the graph denote the red-emitting phosphors coated with indium sulfide according to this invention and with a conventional pigment of red oxide, respectively. On the other hand, curve C represents the red-emitting phosphor which was not coated with a pigment.

FIG. 1 clearly shows that the phosphor coated with indium sulfide (curve A) is higher in reflectance of light having more than 600 nm of wavelength and lower in reflectance of light having less than 600 nm of wavelength than the phosphor coated with red oxide (curve B). It follows that the phosphor of this invention is prominently advantageous over the conventional phosphor in terms of contrast of picture image displayed on a phosphor screen.

In the Example described above, the phosphor coated with indium sulfide was obtained as precipitate. But, this invention is not necessarily restricted to this method. For example, it is possible to prepare indium sulfide alone, followed by coating the phosphor with the indium sulfide by using a suitable bonding agent like, for example, zinc silicate.

In this case, the resultant phosphor is substantially equal in spectral reflectance to the phosphor obtained in the Example described above.

EXAMPLE 2

100 g of indium chloride was dissolved in 250 ml of deionized water, followed by circulating hydrogen sulfide ($H_2S$) through the aqueous solution for 3 hours at the rate of 1 l per minute so as to precipitate part of the indium ions present in the solution in the form of indium sulfide particles. The precipitated particles, which were obtained by removing the supernatent liquid, were washed with deionized water and then, dried at about 100° C. The dried particles were colored reddish orange.

3 g of sulfur was sufficiently mixed with 100 g of the dried particles and, then, the mixture was heated for 30 minutes in a quartz crucible at 500° C. under a weakly reducing atmosphere, thereby obtaining red indium sulfide particles sized at 0.5 to $1\mu$. Further, 1 g of the indium sulfide particles were dispersed in about 500 ml of water together with 100 g of yttrium oxysulfide activated by europium, followed by adding 1 ml of 25 mol % aqueous solution of water-glass ($K_2O \cdot 3SiO_2$) to the dispersion with the dispersion kept gently stirred. The stirring was continued for additional 5 minutes and, then, 10 ml of an zinc sulfate aqueous solution containing 0.4 mol/l of zinc sulfate was added to the dispersion.

The zinc sulfate-added dispersion was stirred for about 15 minutes and, then, allowed to stand still to precipitate the phosphor particles. The phosphor particles, which were obtained by removing the supernatent liquid, were washed with deionized water and, then, dried at about 100° C. The resultant phosphor coated with pigment was substantially equivalent to the one obtained in Example 1 in spectral reflectance.

EXAMPLE 3

250 g of europium activated yttrium oxysulfide (red-emitting phosphor) was dispersed in 2,500 ml of deionized water, followed by adding to the dispersion 10 ml of an indium chloride aqueous solution containing 2.5 g of indium ions. Hydrochloric acid was added to the dispersion, which was kept gently stirred, to adjust the pH value of the dispersion at about 2.2 (allowable value ranging between 1 and 3.6). Further, 200 ml of an aqueous solution containing 1.7 g of sodium sulfide ($Na_2S$) was allowed to drip into the dispersion which was kept stirred.

The dispersion was further kept stirred for more than one hour for the purpose of aging, thereby allowing substantially all the indium ions present in the dispersion to be deposited on the surface of the phosphor particle in the form of indium sulfide particles. After precipitation of the phosphor particles, the supernatent liquid was removed and the phosphor particles thus obtained were washed with deionized water and, then, dried at about 125° C., thereby obtaining slightly orangy-yellow phosphor particles coated with pigment.

1.15 g of sodium carbonate and 25 g of sulfur were sufficiently mixed with 250 g of the dried particles and the mixture was heated 30 minutes in a quartz crucible at 850° C. under a weakly reducing atmosphere. The resultant phosphor particles, which were yellow, were found to have a composition of 0.6 $Na_2S \cdot In_2S_3$ and exhibited a spectral reflectance as denoted by curve B in FIG. 2. Further the phosphor particles were water washed, dried and, then, baked for 1 hour of 500° C. under air atmosphere. After the baking treatment, the phosphor particles turned brilliantly red. Curve B in FIG. 3 represents the spectral reflectance of the phosphor after the baking treatment.

Curve A in FIG. 2 denotes the red-emitting phosphor which was not coated with a pigment. On the other hand, curves C and D represent red-emitting phosphors coated with conventional red pigments of red oxide ($Fe_2O_3$) and cadmium sulfoselenide, respectively. FIGS. 2 and 3 cover the spectral reflectances before and after the baking treatment at 500° C. for 1 hour, respectively.

The conventional pigment of red oxide ($Fe_2O_3$) is not discolored thermally at temperatures lower than 800° C. Naturally, the red oxide, which is pink, remained pink after the baking treatment at 500° C. for 1 hour. The other conventional pigment of cadmium sulfoselenide, Cd(SSe), is subject to color change from red to dark pink at 450° to 500° C. In fact, Cd(SSe) turned dark pink after the baking treatment at 500° C. for 1 hour. On the other hand, a yellow complex compound of 0.6 $Na_2S \cdot In_2S_3$ was converted to a red pigment consisting of indium sulfide and sodium sulfate by the baking treatment at 500° C. for 1 hour. Incidentally, the red pigment mentioned is not discolored at temperatures lower than 600° C. As a matter of fact, it was confirmed that the red pigment remained red after additional baking treatment at 500° C.

Figure 3:
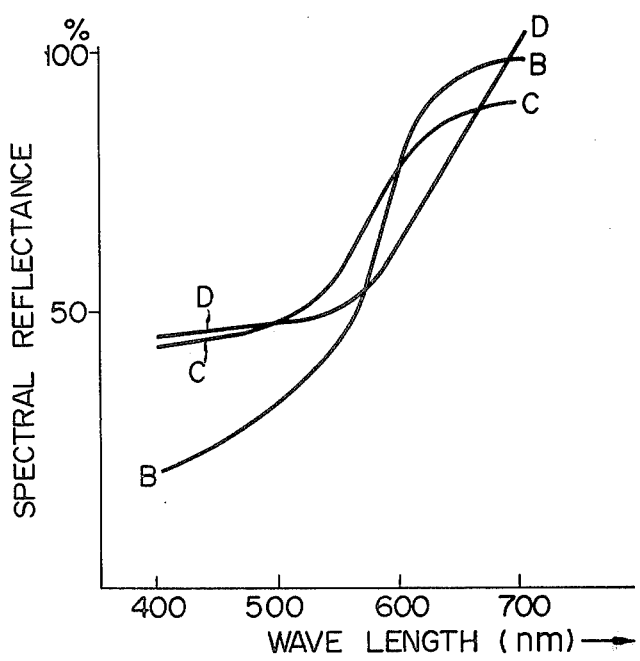
FIG. 3 is a graph showing the spectral reflectance of the phosphors obtained by baking the pigment-coated phosphors of FIG. 2.

FIG. 3 clearly shows that the red pigment according to this invention (curve B) is higher in spectral reflectance of light having more than 600 nm of wavelength and lower in spectral reflectance of light having less than 600 nm of wavelength than the conventional red pigments. Naturally, a phosphor screen comprising the red-emitting phosphor coated with the red pigment of this invention is capable of displaying a picture image of good contrast under bright external light.

An additional experiment was conducted in order to look into the luminous reflectance, powder brightness and screen brightness of phosphors coated with pigments in comparison with a phosphor which was not coated with a pigment. Specifically, europium activated yttrium oxysulfide phosphors were coated with a pigment of this invention consisting of sodium sulfate and indium sulfide and with a conventional pigment of red iron oxide, respectively, for this experiment. The following table shows the results of the experiment.

| | Properties of Phosphors | | |
|---|---|---|---|
| Pigment Used | Luminous Reflectance | Powder Brightness | Screen Brightness |
| $Na_2SO_4/In_2S_3$ | 0.574 | 73.5% | 92% |
| Red iron oxide ($Fe_2O_3$) | 0.620 | 72.5% | 89% |
| None | 0.880 | 100% | 100% |

The luminous reflectance mentioned is determined in general by the following equation;

$$Y = \sum_{400}^{700} P\lambda \, \bar{y}\lambda \, \rho\lambda \, \Delta\lambda$$

where,
Y: Luminous reflectance,
P$\lambda$: Energy distribution of standard illuminent C,
$\bar{y}\lambda$: Relative luminosity,
$\pi\lambda$: Spectral reflectance of phosphor, and
$\Delta\lambda$: Wavelength interval (10 nm).

The above table clearly shows that the phosphor of this invention is lower in luminous reflectance and higher in brightness than the conventional phosphor coated with red iron oxide.

EXAMPLE 4

100 g of indium chloride was dissolved in 2,500 ml of deionized water, followed by circulating hydrogen sulfide through the aqueous solution for 3 hours at the rate of 1 l per minute, thereby partly precipitating the indium ions present in the solution in the form of indium sulfide particles. Then, the precipitated particles, which were obtained by removing the supernatant liquid, were washed with deionized water, followed by drying the washed particles at about 100° C. Further, 22 g of sodium carbonate and 10 g of sulfur were sufficiently mixed with 70 g of the dried particles which were reddish orange. The mixture was heated 30 minutes in a quartz crucible at 850° C. under a weakly reducing atmosphere. The resultant baked product was found to have a composition of 0.76 $Na_2S \cdot In_2S_3$.

4.4 g of the baked product and 250 g of europium activated yttrium oxide were suspended in a 1000 ml of deionized water. While slowly stirring the suspended liquid, 2 ml of water glass ($K_2O \cdot 3SiO_2$) solution (25 mol %) was added to the liquid. The stirring was continued for additional 5 minutes and, then, 20 ml of zinc sulfate aqueous solution containing 0.4 mol/l of zinc sulfate was added to the liquid.

After stirring the mixture for 15 minutes, the mixture was allowed to stand still to precipitate the phosphor particles, and then the supernatant liquid was discharged and the precipitated particles washed with deionized water. Thus obtained solid particles were dried at a temperature of 100° C. The dried phosphor particles were yellow in color, but turned into red as in Example 3 after being baked in air for one hour at a temperature of 500° C.

EXAMPLE 5

250 g of phosphor particles coated with indium sulfide, obtained as in Example 3, were sufficiently mixed with 0.8 g of lithium carbonate and 25 g of sulfur. Then, the mixture was subjected to heating for 30 minutes at 800° C., followed by water-wash and drying so as to obtain faintly yellow phosphor particles. Finally, the phosphor particles were baked 1 hour at 500° C. under air atmosphere, thereby obtaining such red phosphor particles as in Example 3.

EXAMPLE 6

The procedures of Example 5 were followed except that 1.5 g of potassium carbonate was used in place of lithium carbonate and the heat treatment was carried out at 900° C. for 30 minutes in stead of 800° C. for 30 minutes. The resultant phosphor particles, which were orange, turned red after baking treatment at 500° C. for 1 hour.

EXAMPLE 7

250 g of phosphor particles coated with indium sulfide, obtained as in Example 3, were sufficiently mixed with 0.2 g of lithium carbonate, 0.9 g of sodium carbonate and 25 g of sulfur, followed by heating the mixture at 850° C. for 30 minutes. The resultant phosphor particles were faintly yellow after the subsequent treatments of water-wash and drying, but turned red as in Example 3 after being baked at 500° C. for 1 hour under air atmosphere.

EXAMPLE 8

250 g of phosphor particles coated with indium sulfide, obtained as in Example 3, were washed twice with deionized water, followed by adding an aqueous solution containing 0.85 g of sodium sulfide to the washed phosphor particles.

After being dried at about 125° C., the phosphor particles were sufficiently mixed with 25 g of sulfur and, then, the mixture was heated at 850° C. for 30 minutes. The resultant water-washed mixture was yellow but turned red after a baking treatment for 1 hour at 500° C. The baked phosphor was found to exhibit a spectral reflectance substantially equal to that in Example 3.

Additional experiments were conducted along with the procedures described above except that the sodium sulfide used in the above experiment was replaced by sulfides of other alkali metals, obtaining satisfactory results.

EXAMPLE 9

245 g of europium activated yttrium oxide (red-emitting phosphor) particles having an average particle size of about 6μ were dispersed in 1,000 ml of deionized water. Then, 10 ml of an indium chloride aqueous solution containing 2.5 g of indium ions was added and sufficiently mixed with the dispersion, followed by drying the dispersion at about 125° C. Further, the dried dispersion was sufficiently mixed with 1.15 g of sodium carbonate and 25 g of sulfur. The mixture was heated at 850° C. for 30 minutes and, then, water-washed and dried so as to obtain yellow phosphor particles. Finally, the phosphor particles were baked 1 hour at 500° C.

The baked phosphor particles exhibited a spectral reflectance substantially equivalent to curve B shown in FIG. 3. In other words, the baked phosphor particles were brilliantly red as in Example 3.

EXAMPLE 10

7.1 g of dried indium sulfide particles were obtained as in Example 4. Then, 240 g of europium activated yttrium oxide (red-emitting phosphor), 1.15 g of sodium carbonate and 25 g of sulfur were uniformly mixed with said 7.1 g of indium sulfide, followed by heating the mixture at 850° C. for 30 minutes. The heat-treated mixture was washed with water and, then, dried, thereby obtaining a yellow phosphor. Finally, the yellow phosphor was baked at 500° C. for 1 hour, thereby obtaining a red phosphor exhibiting a spectral reflectance substantially equal to that in Example 3.

Incidentally, lithium, sodium and potassium alone were used as the alkali metals in the Examples described above. But, rubidium and cesium were also found satisfactory for use in this invention, though these alkali metals are somewhat costly.

EXAMPLE 11

A homogeneous mixture consisting of 250 g of europium activated yttrium oxysulfide particles having an average particle size of about 7μ, 3.02 g of indium oxide, 1.15 g of sodium carbonate and 25 g of sulfur was heated at 900° C. for 30 minutes. The heat-treated mixture, which was subsequently water-washed and dried, was baked at 500° C. for 1 hour, thereby obtaining a red phosphor exhibiting a spectral reflectance substantially equal to that in Example 3.

What we claim is:

1. A red pigment-coated phosphor, comprising a red-emitting rare earth element-based phosphor body activated by europium and a red pigment coated on the phosphor body, said red pigment selected from the group consisting of indium sulfide and a mixed composition of $In_2S_3$ and $A_2SO_4$, wherein A is an alkali metal and wherein the $A_2SO_4$ covers the surface of the $In_2S_3$; said composition being formed in situ by baking the phosphor body coated with yellow complex sulfide having the formula $xA_2S \cdot yIn_2S_3$ wherein $(0.1 \leq x/y \leq 1.5)$ in an oxygen-containing atmosphere at about 400° to about 600° C. and wherein the ratio of $A_2SO_4$ to $In_2S_3$ is in the range of 0.1:1 to 1.5:1.

2. The phosphor according to claim 1, wherein the rare earth element-based phosphor body activated by europium is selected from the group consisting of europium activated yttrium oxide, europium activated yttrium oxysulfide, europium activated yttrium vanadate, europium activated gadolimium oxide and europium activated gadolimium oxysulfide.

3. A method of producing a red pigment-coated red-emitting europium activated rare earth element-based phosphor, comprising baking in an oxygen-containing atmosphere at 400° to 600° C. a red-emitting rare earth element-based phosphor body activated by europium, said phosphor body being coated with a yellow complex compound containing an alkali metal sulfide and indium sulfide, which is represented by the formula, $xA_2S \cdot yIn_2S_3$ wherein A is at an alkali metal, and the ratio of x/y is within the range of 0.1 to 1.5, thereby converting the complex compound into a red pigment consisting of an alkali metal sulfate and indium sulfide.

4. The method according to claim 3 wherein the europium-activated rare earth element-based phosphor body is selected from the group consisting of europium activated yttrium oxide, europium activated yttrium oxysulfide, europium activated yttrium vanadate, europium activated gadolimium oxide and europium activated gadolimium oxysulfide.

* * * * *